US012410910B1

(12) United States Patent
Cugini et al.

(10) Patent No.: US 12,410,910 B1
(45) Date of Patent: Sep. 9, 2025

(54) LIGHT ASSEMBLY FOR A FIREHOSE NOZZLE

(71) Applicant: FoxFury LLC, Oceanside, CA (US)

(72) Inventors: Mario Cugini, Oceanside, CA (US); Chris Raven, Oceanside, CA (US); Thomas J. Horner, Oceanside, CA (US)

(73) Assignee: FoxFury LLC, Oceanside, CA (US)

( * ) Notice: Subject to any disclaimer, the term of this patent is extended or adjusted under 35 U.S.C. 154(b) by 0 days.

(21) Appl. No.: 19/219,749

(22) Filed: May 27, 2025

Related U.S. Application Data

(60) Provisional application No. 63/651,966, filed on May 25, 2024.

(51) Int. Cl.

| | |
|---|---|
| ***F21V 33/00*** | (2006.01) |
| ***A62C 31/28*** | (2006.01) |
| ***F21S 9/02*** | (2006.01) |
| ***F21V 21/08*** | (2006.01) |
| ***F21V 21/088*** | (2006.01) |
| ***F21V 21/30*** | (2006.01) |
| ***F21V 23/04*** | (2006.01) |
| ***F21Y 113/13*** | (2016.01) |
| ***F21Y 115/10*** | (2016.01) |

(52) U.S. Cl.
CPC .......... *F21V 33/0064* (2013.01); *A62C 31/28* (2013.01); *F21S 9/02* (2013.01); *F21V 21/08* (2013.01); *F21V 21/088* (2013.01); *F21V 21/30* (2013.01); *F21V 23/0407* (2013.01); *F21Y 2113/13* (2016.08); *F21Y 2115/10* (2016.08)

(58) Field of Classification Search
CPC ..... F21V 33/0064; F21V 21/088; A62C 31/28
USPC .......... 362/96
See application file for complete search history.

(56) References Cited

U.S. PATENT DOCUMENTS

| | | | | |
|---|---|---|---|---|
| 5,795,053 | A | 8/1998 | Pierce | |
| 6,116,520 | A | 9/2000 | Lee | |
| 7,942,544 | B2 * | 5/2011 | Smathers | F21V 33/0076 340/626 |
| 8,109,645 | B2 | 2/2012 | Liao | |
| 8,919,979 | B2 | 12/2014 | Mabry et al. | |
| 9,631,806 | B2 | 4/2017 | Mabry et al. | |
| 10,900,658 | B1 * | 1/2021 | Lee | F21S 9/02 |
| 2010/0103646 | A1 * | 4/2010 | Coushaine | F03B 13/00 362/96 |
| 2012/0120630 | A1 | 5/2012 | Liao et al. | |
| 2015/0131262 | A1 * | 5/2015 | Mabry, Jr. | F21V 31/00 362/96 |

* cited by examiner

*Primary Examiner* — William N Harris
(74) *Attorney, Agent, or Firm* — CP LAW GROUP PC; Cy Bates

(57) ABSTRACT

A light assembly includes a light fixture detachably coupled to a mounting subassembly that secures around a firehose nozzle. The light fixture incorporates a housing having a front side formed with a plurality of front apertures, a back side, top side, bottom side, and plurality of lateral sides, one of which carries a side aperture. A plurality of light sources is positioned at the front apertures to emit light in the same direction as the nozzle discharge, while a battery is situated between the light sources and the back side to create a low-profile silhouette. The light fixture and the mounting subassembly comprise complementary interlocking mechanisms for providing fast installation and detachability of the light fixture with the mounting subassembly.

20 Claims, 16 Drawing Sheets

LIGHT ASSEMBLY FOR A FIREHOSE NOZZLE

CROSS-REFERENCE TO RELATED APPLICATIONS

This application claims benefit of priority with U.S. Provisional Application Ser. No. 63/651,966, filed May 25, 2024; the entire contents of which are hereby incorporated by reference.

BACKGROUND

Field of the Invention

This disclosure relates to a light system, and more particularly to a light system configured to couple to a firehose nozzle.

Description of the Related Art

Firefighters often combat structural fires and outdoor brush fires with low light and poor visibility. Having a light attached to a firehose nozzle would help firefighters to properly see and aim. However, there have been several attempts at solving this problem with each one having significant deficiencies that has prevented it from having actual real-world industrial use.

Liao (U.S. Pat. No. 8,109,645) teaches integrating a light assembly between the firehose nozzle and firehose and uses a generator powered by the flow of water to power the lights. However, the biggest need for lighting is before the water is turned on. Additionally, requiring the light assembly to be installed between the firehose nozzle and firehose requires additional steps when deploying the firehose which can delay the response to putting out fires.

Lee (U.S. Pat. No. 6,116,520) teaches a firehose nozzle integrated with a light assembly. The light assembly is attached at a center of the nozzle. Lee would require modification of standard firehose nozzles which increases likelihood of failure.

Pierce (U.S. Pat. No. 5,795,053) teaches a light assembly fixedly attached to the firehose nozzle. However, the design of Pierce is prone to damage by the firehose nozzle which weighs a considerable amount and is often thrown and dragged around. Also, Pierce provides little options for fast attachment and detachment during the critical time of setup.

There is a need for a light assembly that overcomes these deficiencies and can be readily used with firehose nozzles.

SUMMARY

A light assembly for a firehose nozzle is disclosed. The light assembly comprises a light fixture detachably coupled to a complementary mounting subassembly that secures around a firehose nozzle. The light fixture incorporates a housing having a front side formed with a plurality of front apertures, a back side, top side, bottom side, and plurality of lateral sides, one of which carries a side aperture. Within the housing, a plurality of light sources is positioned at the front apertures to emit light in the same direction as the nozzle discharge, while a battery is situated between the light sources and the back side to create a low-profile silhouette. The light fixture and the mounting subassembly comprise complementary interlocking mechanisms for providing fast installation and detachability of the light fixture with the mounting subassembly. In some embodiments, the mounting subassembly is configured to slidably rotate about the firehose nozzle upon external force while otherwise maintaining a fixed position. Collectively these features deliver a rugged, low-profile, water-resistant lighting solution that installs without modifying the nozzle, detaches for battery servicing, and withstands the rough handling typical of firefighting operations.

BRIEF DESCRIPTION OF THE DRAWINGS

Other features, combinations, and embodiments will be appreciated by one having the ordinary level of skill in the art upon a thorough review of the following details and descriptions, particularly when reviewed in conjunction with the drawings, wherein.

DETAILED DESCRIPTION

Figure 1:
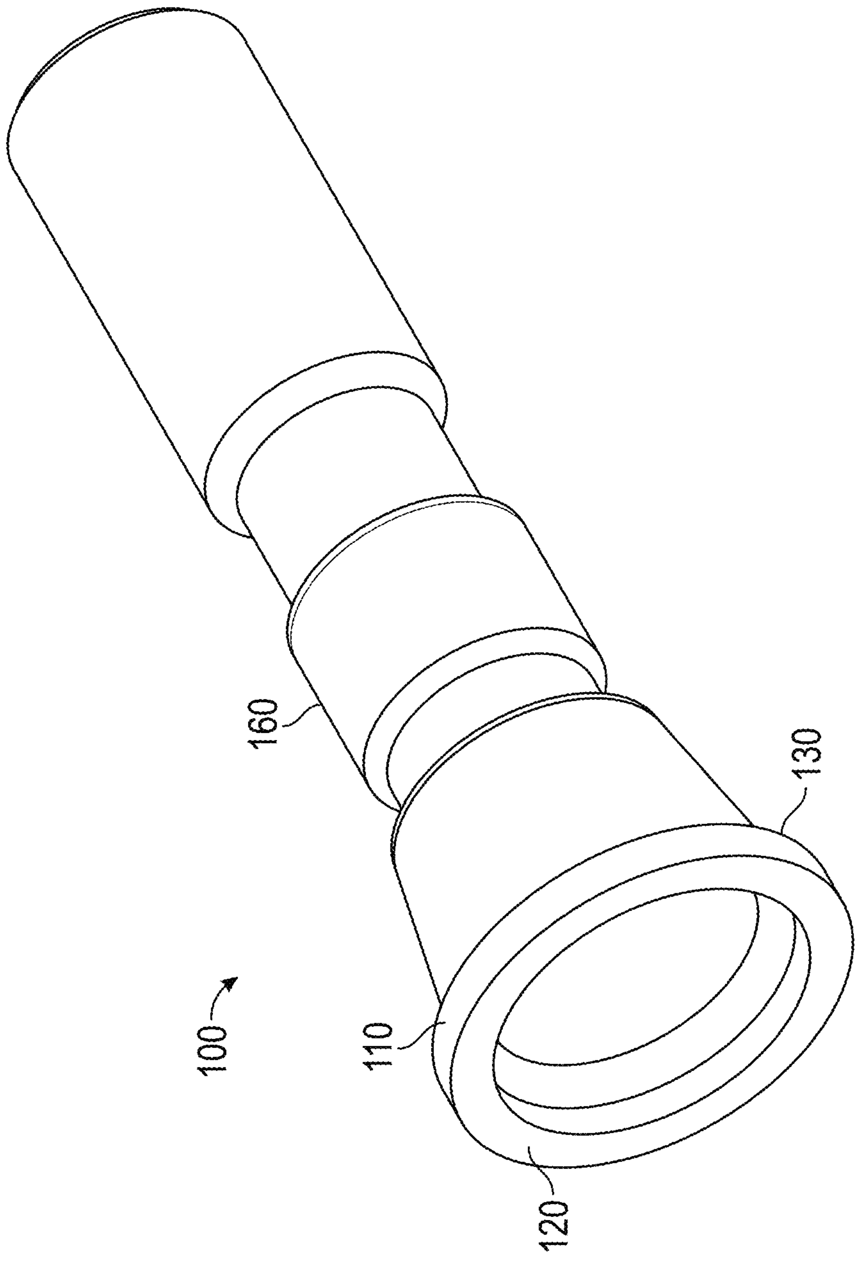
FIG. 1 (Prior Art)
FIG. 1 shows a perspective view of a conventional firehose nozzle.

For purposes of explanation and not limitation, details and descriptions of certain preferred embodiments are hereinafter provided such that one having ordinary skill in the art may be enabled to make and use the invention. These details and descriptions are representative only of certain preferred embodiments, however, a myriad of other embodiments which will not be expressly described will be readily understood by one having skill in the art upon a thorough review of the instant disclosure. Accordingly, any reviewer of the instant disclosure should interpret the scope of the invention only by the claims, as such scope is not intended to be limited by the embodiments described and illustrated herein.

The features, components, and configurations described in connection with the various embodiments illustrated herein may be combined, interchanged, or otherwise modified in any number of ways without departing from the scope and spirit of the invention. The embodiments are presented by way of example and not limitation, and it is intended that the invention encompasses all such combinations, permutations, and modifications as would be understood by those skilled in the art.

For purposes herein, the terms "actuator" includes button, switch, knob, and the like.

The term "light source" includes light emitting diodes and other components for emitting light. Light source includes one or more components.

The term "amber hue" means light whose dominant wavelength falls between and inclusive of 575 nm and 610 nm.

The term "green hue" means light whose dominant wavelength falls between and inclusive of 500 nm and 565 nm.

Unless explicitly defined herein, terms are to be construed in accordance with the plain and ordinary meaning as would be appreciated by one having skill in the art.

General Description of Embodiments

In a general embodiment, a light assembly is disclosed. The light assembly comprises a light fixture and a mounting subassembly detachably coupled to the light fixture. The light fixture comprises a housing having a front side, a back side opposite the front side, a top side, a bottom side opposite the top side, and a plurality of lateral sides. The housing further comprises a plurality of front apertures disposed on the front side and a side aperture disposed on one of the plurality of lateral sides. The light fixture further comprises a plurality of light sources disposed at the plurality of front apertures configured to emit light in a same direction, an actuator disposed at the side aperture configured to control the plurality of light sources, a battery disposed within an interior of the housing between the plurality of light sources and the back side, the battery configured to power the plurality of light sources, and a plurality of latches disposed on the housing, the plurality of latches comprising a spring bias and configured to rotatably move. The mounting subassembly comprises an opening having an adjustable diameter, the opening configured to surround a firehose nozzle, an upper half and a lower half separate and distinct from the upper half, the upper half and lower half forming said opening, one or more fasteners coupling the upper half to the lower half, and a plurality of slots configured to detachably engage with the plurality of latches.

In some embodiments, the actuator may be configured to control power, brightness, color, blinking, or a combination thereof.

In some embodiments, at least one of the plurality of light sources may comprise a first color and at least one of the plurality of light sources may comprise a second color wherein the first color comprises a different wavelength from the second color. The first color may comprise an amber hue and the second color may comprise a green hue.

In some embodiments, the mounting subassembly may further comprise a flange disposed between the plurality of slots, wherein the housing abuts with said flange.

In some embodiments, the lower half of the mounting subassembly may further comprise a flat bottom surface.

In another general embodiment, a light assembly is disclosed. The light assembly comprises a light fixture detachably coupled to a mounting subassembly. The light fixture comprises a housing having a front side, a back side opposite the front side, a top side, a bottom side opposite the top side, and a plurality of lateral sides. The housing further comprises a plurality of front apertures disposed on the front side. The light fixture further comprises a plurality of light sources disposed at the plurality of front apertures, an actuator configured to control the plurality of light sources, and a battery disposed within an interior of the housing, the battery configured to power the plurality of light sources. The mounting subassembly comprises an opening configured to surround a firehose nozzle.

In some embodiments, the housing may further comprise a side aperture disposed on one of the plurality of lateral sides, wherein the actuator is disposed at the side aperture.

In some embodiments, the battery may be disposed between the plurality of light sources and the back side.

In some embodiments, the actuator may be configured to control power, brightness, color, blinking, or a combination thereof.

In some embodiments, the plurality of light sources may be configured to emit light in a same direction.

In some embodiments, at least one of the plurality of light sources may comprise a first color and at least one of the plurality of light sources comprises a second color wherein the first color comprises a different wavelength from the second color. The first color may comprise an amber hue and the second color may comprise a green hue.

In some embodiments, the mounting subassembly may be configured to slidably rotate about the firehose nozzle upon attachment to said firehose nozzle.

In some embodiments, wherein the opening may comprise an adjustable diameter.

In some embodiments, the mounting subassembly may be configured to couple to an adjustor of the firehose nozzle.

In some embodiments, the light fixture may further comprise a latch disposed on the housing. The mounting subassembly may further comprise a slot, the slot configured to engage with the latch for detachable engagement. The latch may be configured to rotatably move. The latch may further comprise a spring bias. The light fixture may further comprise a plurality of latches wherein each of the plurality of latches is independently movable. The mounting subassembly may further comprise a plurality of slots configured to engage with the plurality of latches wherein the light fixture is configured to be pivotally removed from the mounting subassembly upon pressing of one of the plurality of latches.

In some embodiments, the light fixture may further comprise a slot disposed on the housing, and the mounting subassembly may further comprise a latch wherein the latch is configured to engage with the slot.

In some embodiments, the mounting subassembly may further comprise a front plate and a back plate coupled to the front plate by a plurality of pins.

In some embodiments, the mounting subassembly may further comprise a clamp configured to adjust a diameter of the opening.

In some embodiments, the mounting subassembly may further comprise an upper half and a lower half separate and distinct from the upper half, the upper half and the lower half forming said opening. The upper half may couple to the lower half by one or more fasteners.

In another general embodiment, A firehose nozzle light assembly system is disclosed. The system comprises a firehose nozzle and a light assembly coupled to the firehose nozzle. The firehose nozzle comprises an adjustor coupled to a body. The light assembly comprises a light fixture detachably coupled to a mounting subassembly. The light fixture comprises a housing having a front side, a back side opposite the front side, a top side, a bottom side opposite the top side, and a plurality of lateral sides. The housing further comprises a plurality of front apertures disposed on the front side. The light fixture further comprises a plurality of light sources disposed at the plurality of front apertures, an actuator configured to control the plurality of light sources, and a battery disposed within an interior of the housing, the battery configured to power the plurality of light sources. The mounting subassembly comprises an opening configured to surround the adjustor of the firehose nozzle.

In some embodiments, the housing may further comprise a side aperture disposed on one of the plurality of lateral sides, wherein the actuator is disposed at the side aperture.

In some embodiments, the battery may be disposed between the plurality of light sources and the back side.

In some embodiments, the actuator may be configured to control power, brightness, color, blinking, or a combination thereof.

In some embodiments, the plurality of light sources may be configured to emit light in a same direction.

In some embodiments, at least one of the plurality of light sources may comprise a first color and at least one of the plurality of light sources comprises a second color wherein the first color comprises a different wavelength from the second color. The first color may comprise an amber hue and the second color may comprise a green hue.

In some embodiments, the mounting subassembly may be configured to slidably rotate about the firehose nozzle upon attachment to said firehose nozzle.

In some embodiments, wherein the opening may comprise an adjustable diameter.

In some embodiments, the light fixture may further comprise a latch disposed on the housing. The mounting subassembly may further comprise a slot, the slot configured to engage with the latch for detachable engagement. The latch may be configured to rotatably move. The latch may further comprise a spring bias. The light fixture may further comprise a plurality of latches wherein each of the plurality of latches is independently movable. The mounting subassembly may further comprise a plurality of slots configured to engage with the plurality of latches wherein the light fixture is configured to be pivotally removed from the mounting subassembly upon pressing of one of the plurality of latches.

In some embodiments, the light fixture may further comprise a slot disposed on the housing, and the mounting subassembly may further comprise a latch wherein the latch is configured to engage with the slot.

In some embodiments, the mounting subassembly may further comprise a front plate and a back plate coupled to the front plate by a plurality of pins.

In some embodiments, the mounting subassembly may further comprise a clamp configured to adjust a diameter of the opening.

In some embodiments, the mounting subassembly may further comprise an upper half and a lower half separate and distinct from the upper half, the upper half and the lower half forming said opening. The upper half may couple to the lower half by one or more fasteners.

Manufacturing

Generally, the light fixture and mounting subassembly are made of metal, thermoplastic, or other materials as can be appreciated by one having skill in the art that is durable and resistant to water and high temperatures.

Generally, the light source comprises a high-power light emitting diode.

Generally, the housing of the light fixture comprises water proofing material such as gaskets between at the front and side apertures to prevent water from entering the housing.

Each of the components of the light assembly described herein may be manufactured and/or assembled in accordance with the conventional knowledge and level of a person having skill in the art. Preferably, all bolts and nuts are made on stainless steel.

While various details, features, and combinations are described in the illustrated embodiments, one having skill in the art will appreciate a myriad of possible alternative combinations and arrangements of the features disclosed herein. As such, the descriptions are intended to be enabling only, and non-limiting. Instead, the spirit and scope of the invention is set forth in the appended claims.

Illustrated Embodiments

Figure 2:
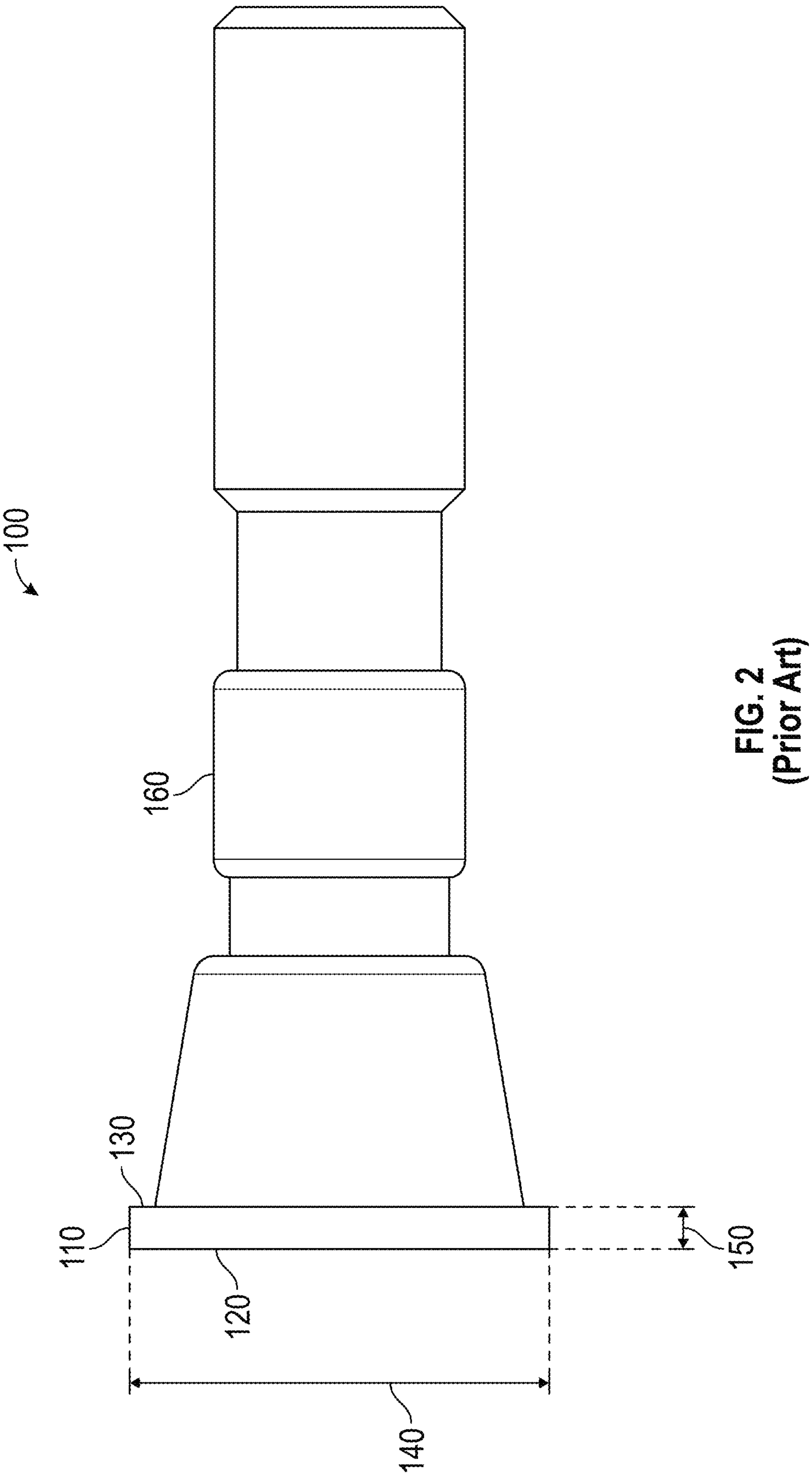
FIG. 2 (Prior Art)
FIG. 2 shows a side view of the conventional firehose nozzle.
Figure 3:
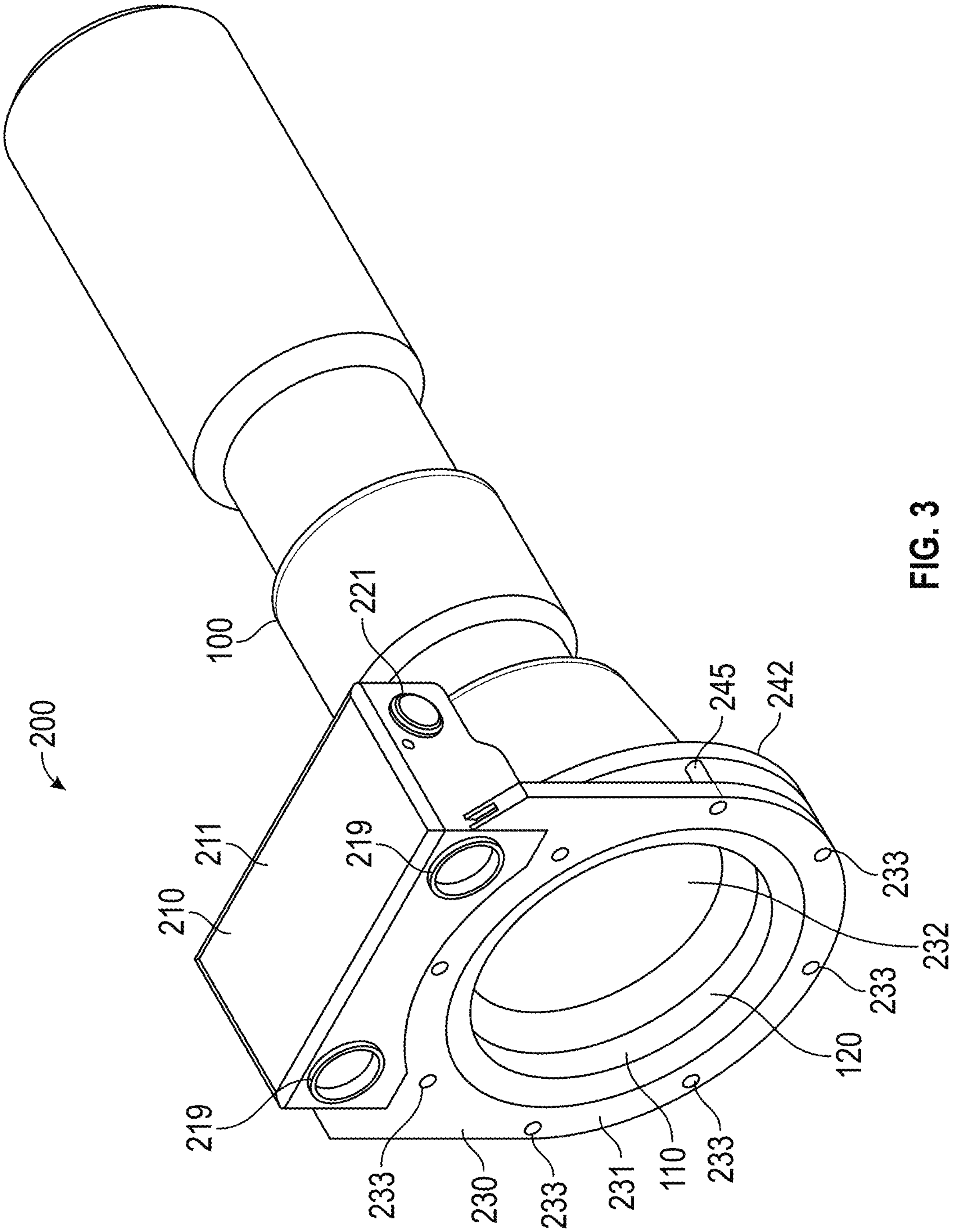
FIG. 3 shows an exploded view of a light assembly coupled to the firehose nozzle in accordance with a first illustrated embodiment.
Figure 4:
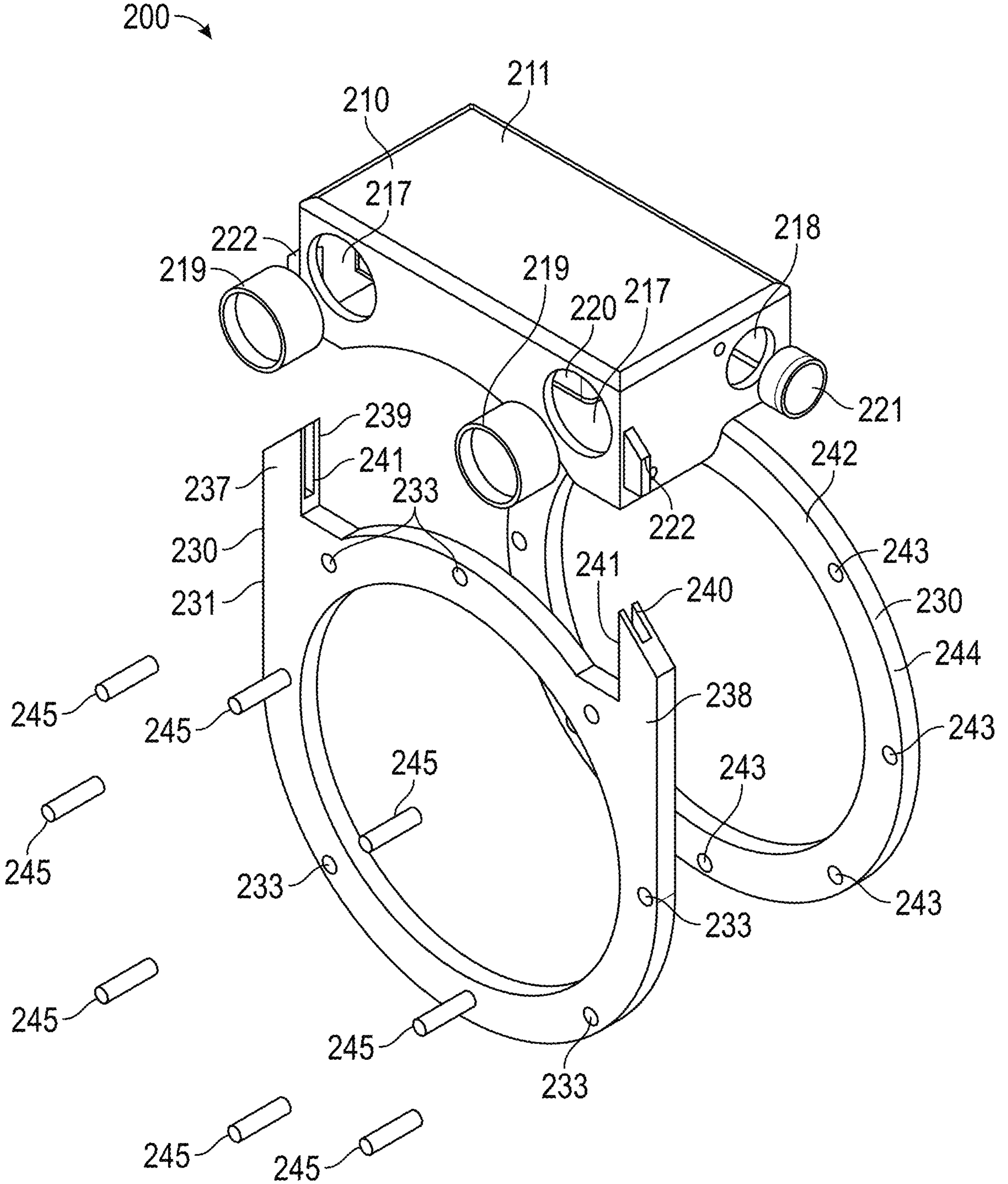
FIG. 4 shows an exploded perspective view of the light assembly according to the first illustrated embodiment.
Figure 5:
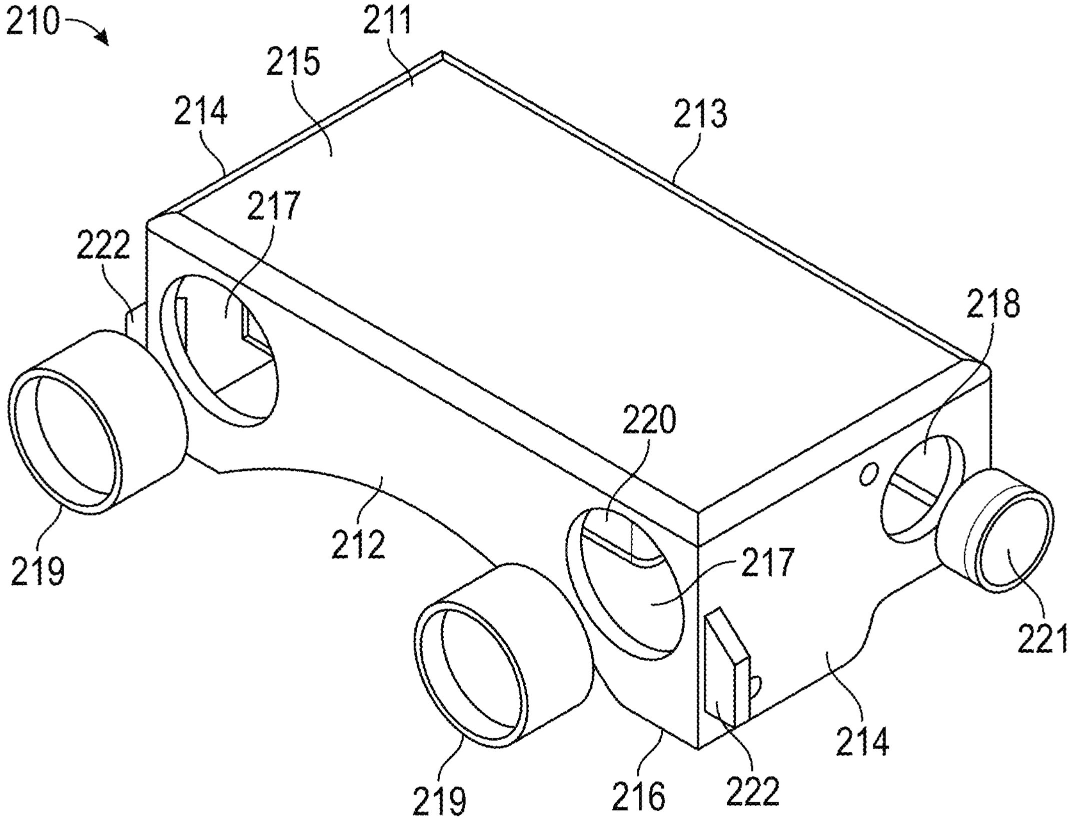
FIG. 5 shows a perspective view of a light fixture of the light assembly according to the first illustrated embodiment.
Figure 6:
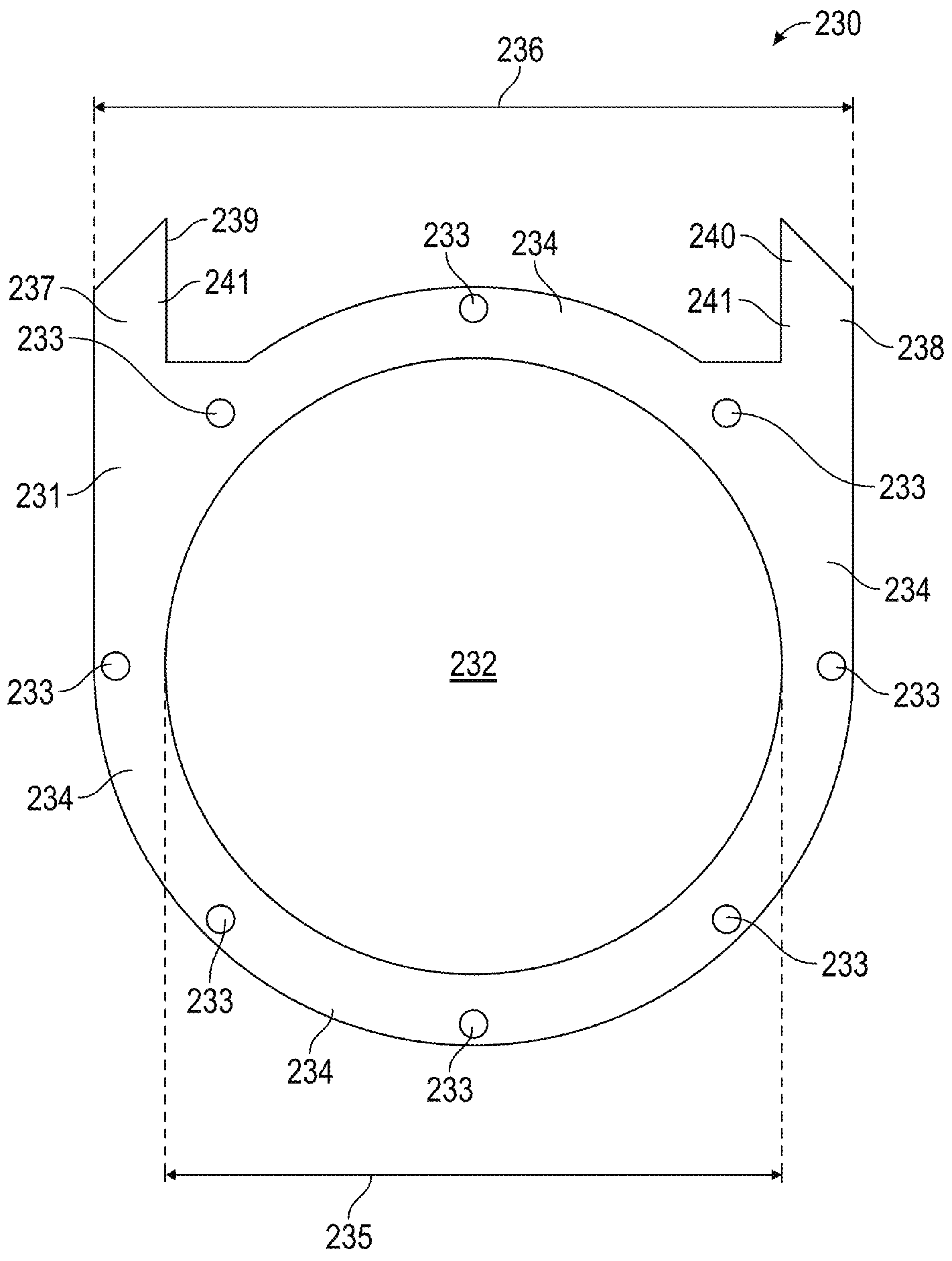
FIG. 6 shows a front view of a mounting subassembly of the light assembly according to the first illustrated embodiment.

Now turning to the drawings, FIGS. 1-2 show a conventional firehose nozzle (100). The firehose nozzle comprises an adjustor (110) coupled to a body (160) of the firehose nozzle. The firehose nozzle may further include a valve handle for regulating water flow with a forward or backward movement. The adjustor can be rotated to shape and direct a water steam emitted from the firehose nozzle. The adjustor comprises an adjustor front end (120) and an adjustor back end (130), wherein the adjustor front end is disposed at an exterior side from where water is ejected from. The adjustor further comprises an adjustor diameter (140) and an adjustor length (150) extending from the adjustor front end to the adjustor back end.

FIGS. 3-6 show a light assembly (200) in accordance with a first illustrated embodiment. The light assembly comprises a light fixture (210) detachably coupled to a mounting subassembly (230), wherein the mounting subassembly is coupled to a firehose nozzle (100). The light fixture comprises light sources (219) configured to emit light in a same direction as water, or other substances, ejected from the firehose nozzle. The light fixture further comprises a battery (220) for powering the light sources and an actuator (221) for powering the light fixture on and off. The light assembly provides necessary lighting for firefighters when dealing with fires in sub-optimal lighting conditions. The detachable coupling between the light fixture and the mounting subassembly allows the light fixture to be decoupled for recharging while also easy to reattach when lighting is desired.

The light fixture (210) comprises a housing (211) having a front side (212) and a back side (213) opposite the front side, a top side (215) and a bottom side (216) opposite the top side, and two lateral sides (214) coupled to each of the front side, back side, top side, and bottom side. The front side comprises a plurality of front apertures (217) wherein the light sources are concentrically aligned with the plurality of front apertures. The plurality of front apertures is configured to hold or otherwise allow the light sources to transmit light therethrough. As shown, the light sources are disposed within the plurality of front apertures. In other embodiments, the light sources are disposed within an interior of the housing such the light sources are positioned behind the plurality of front apertures and the light is able to transmit through the plurality of front apertures. In yet other embodiments, the light sources are disposed on the front side of the housing and the plurality of front apertures are configured to allow electrical connection between the battery and the light sources.

The light fixture (210) further comprises a side aperture (218) disposed on one of the lateral sides (214). The side aperture is configured to receive and store the battery (220) for powering the light sources (219). The actuator (221) is disposed in or behind the side aperture for powering the light sources on and off as well as other possible control options including light intensity, color, flashing, or a combination thereof. A latch (222) is disposed on each lateral side for detachable coupled with the mounting subassembly (230).

The battery (220) is positioned behind the light sources (219) such that the battery is disposed between the light sources and the back side (213) of the housing (211). This allows for a low profile of the light fixture (210) to mitigate damage while attached to the firehose nozzle (100) which is considerably heavy and known to be tossed and thrown around. Having the battery disposed within the same housing as the light sources, which are both positioned above the adjustor (110), prevents chances of damage by the firehose nozzle being dragged on the ground. The actuator (221) being positioned on the lateral side (214) which aids in the low-profile design as well as better protecting the actuator from hard impacts on the top side (215).

The mounting subassembly (230) comprises a front plate (231) and a back plate (242) coupled together by a plurality of pins (245). The front plate is coupled to the firehose nozzle (100) at an adjustor front end (120). The front plate comprises a first cylindrical portion (234) and an opening (232) to allow water from the firehose nozzle to pass through unobstructed. The opening extends in a same direction as light transmitted from the light sources (219) of the light fixture (210). The front plate further comprises a first extrusion (237) and a second extrusion (238) each tangential to and extending above the first cylindrical portion. The first extrusion comprises a first slot (239) at an extrusion inner surface (241) thereof. Likewise, the second extrusion comprises a second slot (240) at an extrusion inner surface (241) thereof. The first and second slots are configured to receive and engage with the latches (222) of the light fixture. Extending radially around the first cylindrical portion are first mounting holes (233). The back plate comprises a second cylindrical portion (244) and second mounting holes (244) corresponding to the first mounting holes. The plurality of pins couples to both the first and second mating holes. In some embodiments, the front plate, the back plate, or both may each comprise separable parts to allow for easy installation around various sections of the firehose nozzle. Due to the positioning of the front plate with the firehose nozzle and how the light fixture couples to the mounting subassembly as disclosed herein, the front side of the light fixture overhangs the firehose nozzle.

The light assembly (200) is configured to couple to the firehose nozzle (100) in a myriad of ways. As shown, the light assembly is coupled to the adjustor (110) of the firehose nozzle. The front plate (231) is coupled to an adjustor front end (120) of the adjustor and the back plate (242) is coupled to an adjustor back end (130). The plurality of pins (245) extends across an adjustor length (150). Other positions for coupling the mounting subassembly (230) and light fixture (210) can be utilized as can be appreciated by one having skill in the art.

In some embodiments, the mounting subassembly (230) is coupled to the firehose nozzle (100) with sufficient friction to maintain a fixed position during operation of the firehose nozzle while also being able to slidably rotate about the firehose nozzle when turned by a firefighter. The light fixture (210) may inadvertently move around the adjustor (110) away from a desirable upright position. The ability to slidably rotate the light fixture back into an upright position by turning the mounting subassembly aids in solving this dilemma. In some scenarios, the firefighter may want the light fixture to be in an alternate position from the upright position and so the rotatable adjustability of the mounting subassembly makes this change seamless and easy. Amount of friction will depend on the material of the firehose nozzle and the mounting subassembly and can be readily determined by one having skill in the art.

The front plate (231) further comprises an inner diameter (235) and an outer diameter (236). The inner diameter is characterized by the diameter of the opening (232). The outer diameter is characterized as a widest length of the first cylindrical portion (234). In embodiments where the mounting subassembly is coupled to the adjustor (110) of the firehose nozzle (100), the outer diameter is greater than the adjustor diameter (140) in order for the plurality of pins (245) to extend across the adjustor length (150) and couple to the back plate (242).

As illustrated herein, latches (222) of the light fixture (210) are configured to slidably engage with the first slot (239) and the second slot (240) of the front plate (231). One having skill in the art will appreciate a myriad of ways of complementary interlocking between the light fixture with the front plate. In some embodiments, the light fixture comprises slots and the front plate comprises latches. In other embodiments, the front plate is devoid of the first and second extrusions and instead the first cylindrical portion comprises a corresponding interlocking mechanism for coupling with the light fixture. Alternatively, the complementary interlocking mechanism can be disposed at a center instead of sides of the light fixture and front plate.

Figure 7:
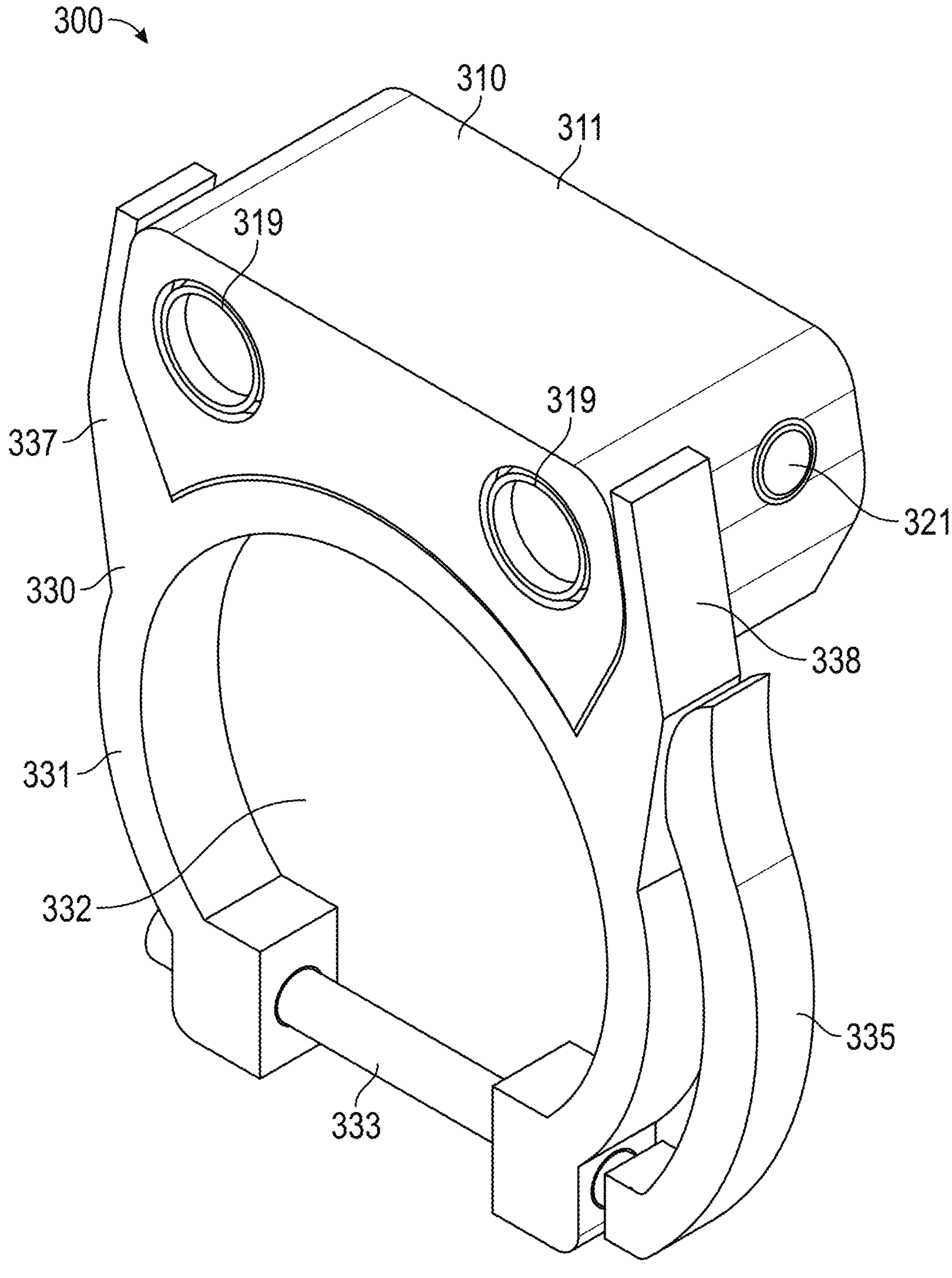
FIG. 7 shows a perspective view of a light assembly in accordance with a second illustrated embodiment.
Figure 8:
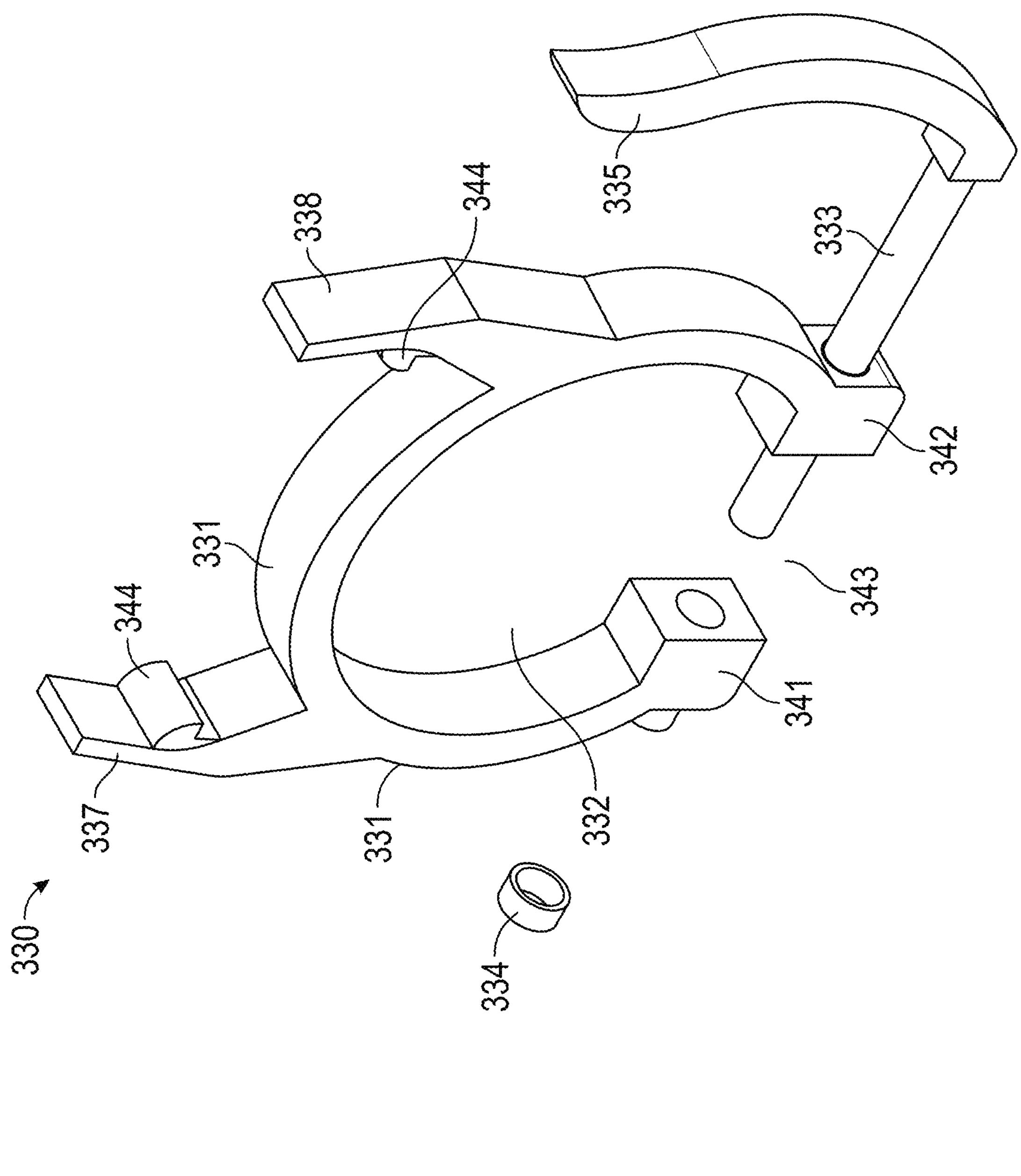
FIG. 8 shows an exploded perspective view of a mounting subassembly of the light assembly according to the second illustrated embodiment.
Figure 9:
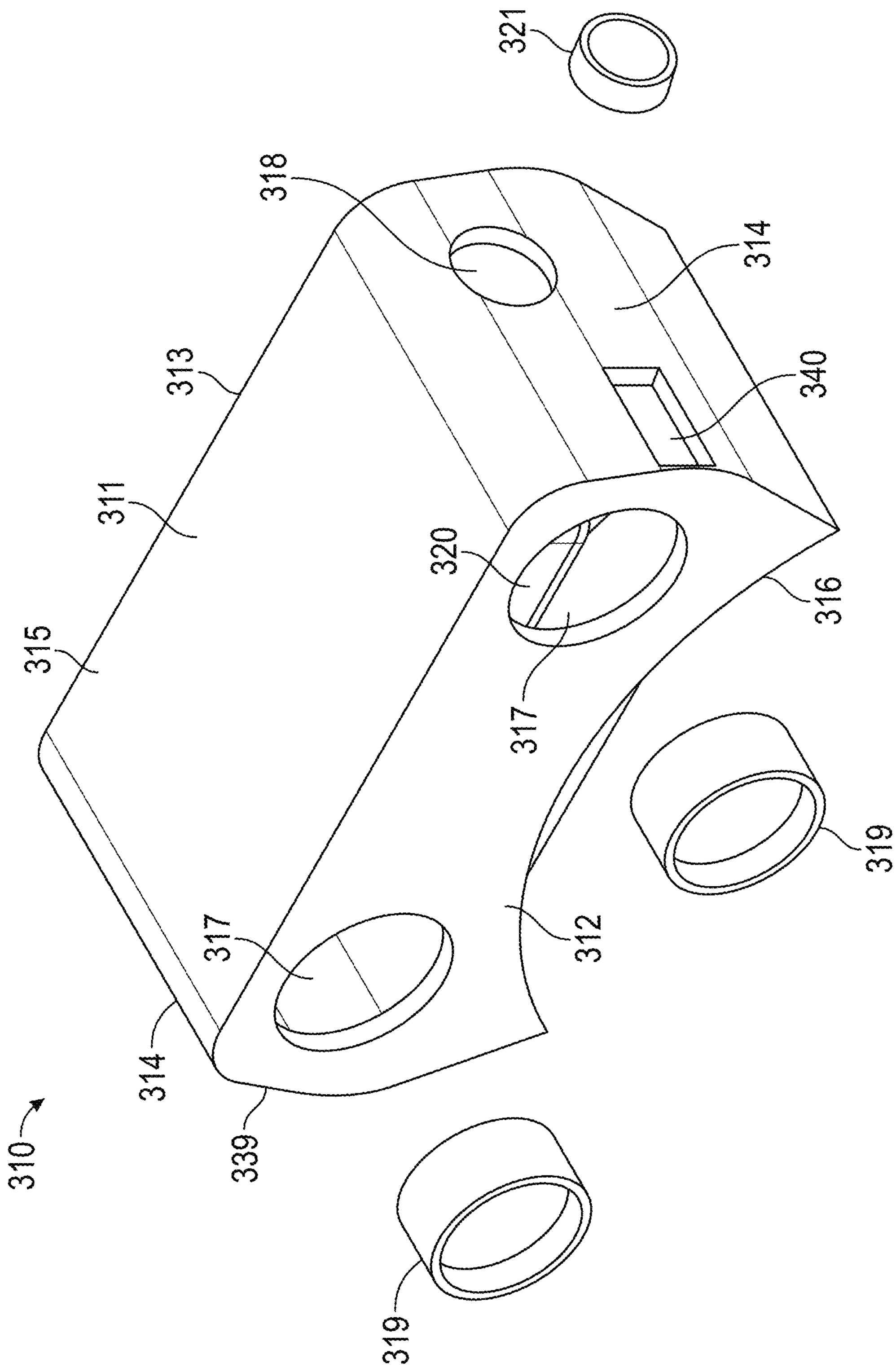
FIG. 9 shows an exploded perspective view of a light fixture of the light assembly according to the second illustrated embodiment.

FIGS. 7-9 show the light assembly (300) in accordance with a second illustrated embodiment. The light assembly comprises a light fixture (310) configured to detachably couple to a mounting subassembly (330). The light fixture comprises a plurality of light sources (319) oriented in a parallel alignment with an opening (332) of the mounting subassembly. The light fixture further comprises a housing (311) having a battery (320) disposed therein, and an actuator (321) disposed on a lateral side (314) of the housing for turning the light sources on and off. The mounting subassembly is configured to attach to a firehose nozzle (FIG. 1, 100) at various locations including a body, an adjustor, and the like. The mounting subassembly comprises a clamp (331) such as a quick-release clamp or a speed clamp. The clamp comprises a first terminal end (341) and a second terminal end (342) wherein a gap (343) is disposed between the first and second terminal ends. A bolt (333) extends through each of the first and second terminal ends. Coupled to one end of the bolt is a nut (334) and coupled to another end is a lever (335). The first terminal end and the second terminal end are configured to minimize the gap by convergence upon tightening of the lever, the nut, or both. The adjustable diameter of the clamp allows the mounting subassembly to fit various sized firehose nozzles.

The mounting subassembly (330) further comprises a first extrusion (337) and a second extrusion (338) extending from the clamp (331). Each of the first and second extrusions comprises a latch (344) configured to engage with a first slot (339) and a second slot (340) of the light fixture (310). Each of the latches may be integrated with the first and second extrusions such that the first and second extrusions are configured to flex when the light fixture couples with the mounting subassembly. In other embodiments, the latches may each be hingedly coupled to the first and second extrusion such that when a portion of either latch is pressed inwards, the latch is configured to rotatably move outwards to disengage from the first slot or second slot of the light fixture. In some embodiments, the mounting subassembly is coupled to the firehose nozzle such that it remains in a fixed position until an external force by a firefighter causes the mounting subassembly to slidably rotate about the firehose nozzle.

The housing (311) of the light fixture (310) further comprises a front side (312), a back side (313) opposite the front side, a top side (315), a bottom side (316) opposite the top side, and two lateral sides (314). The front side comprises a plurality of front apertures (317) configured to engage with the light sources (319) for emitting light. The two lateral sides each include one of the first slot (339) and the second slot (340) for detachable engagement with the mounting subassembly (230). Disposed on one of the two lateral sides is a side aperture (318) configured to receive and store the battery (320) as well as the actuator (321). The battery is disposed between the light sources and the back side in order to form a low profile of the housing. The low profile mitigates damage while attached to the firehose nozzle. Likewise, the actuator is disposed on the lateral side instead of the top side in order to mitigate damage to the actuator.

Figure 10:
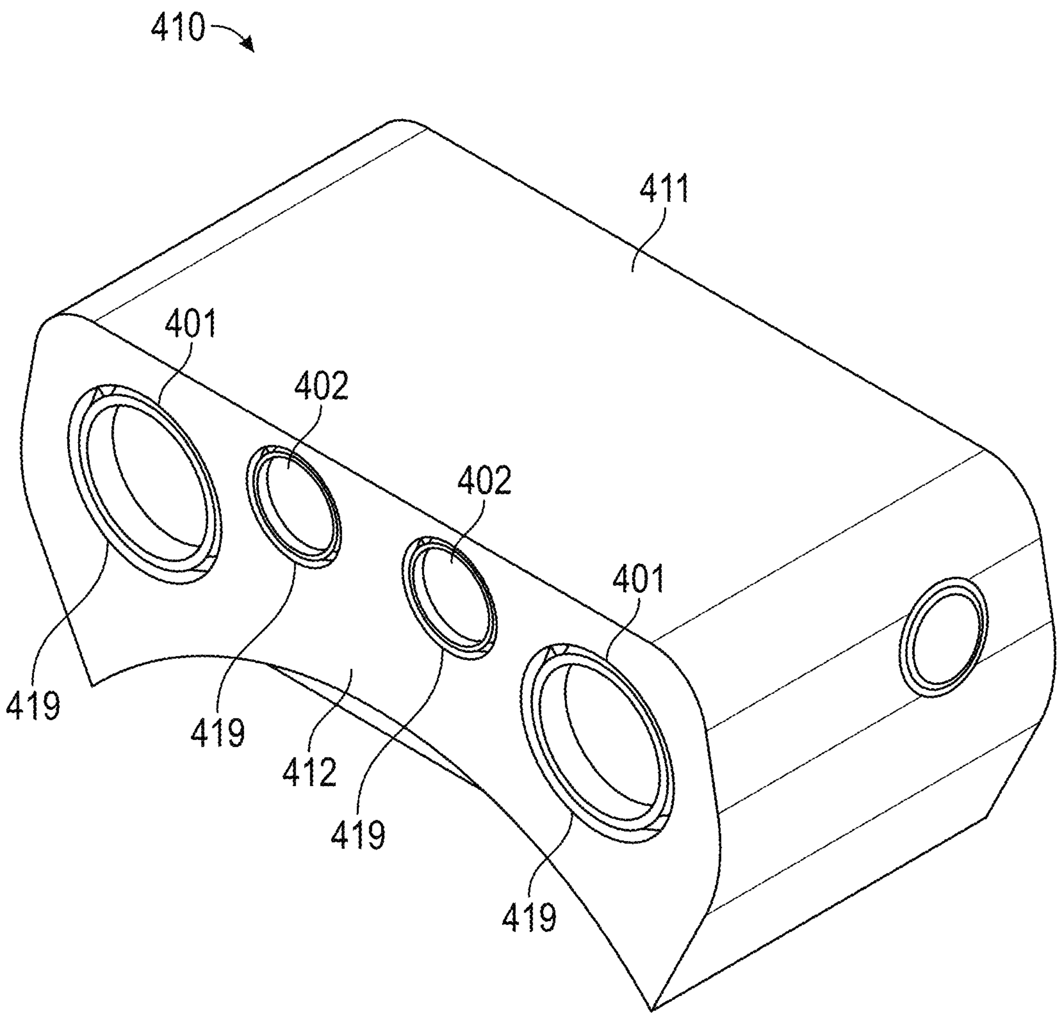
FIG. 10 shows a perspective view of a light fixture in accordance with a third illustrated embodiment.
Figure 11:
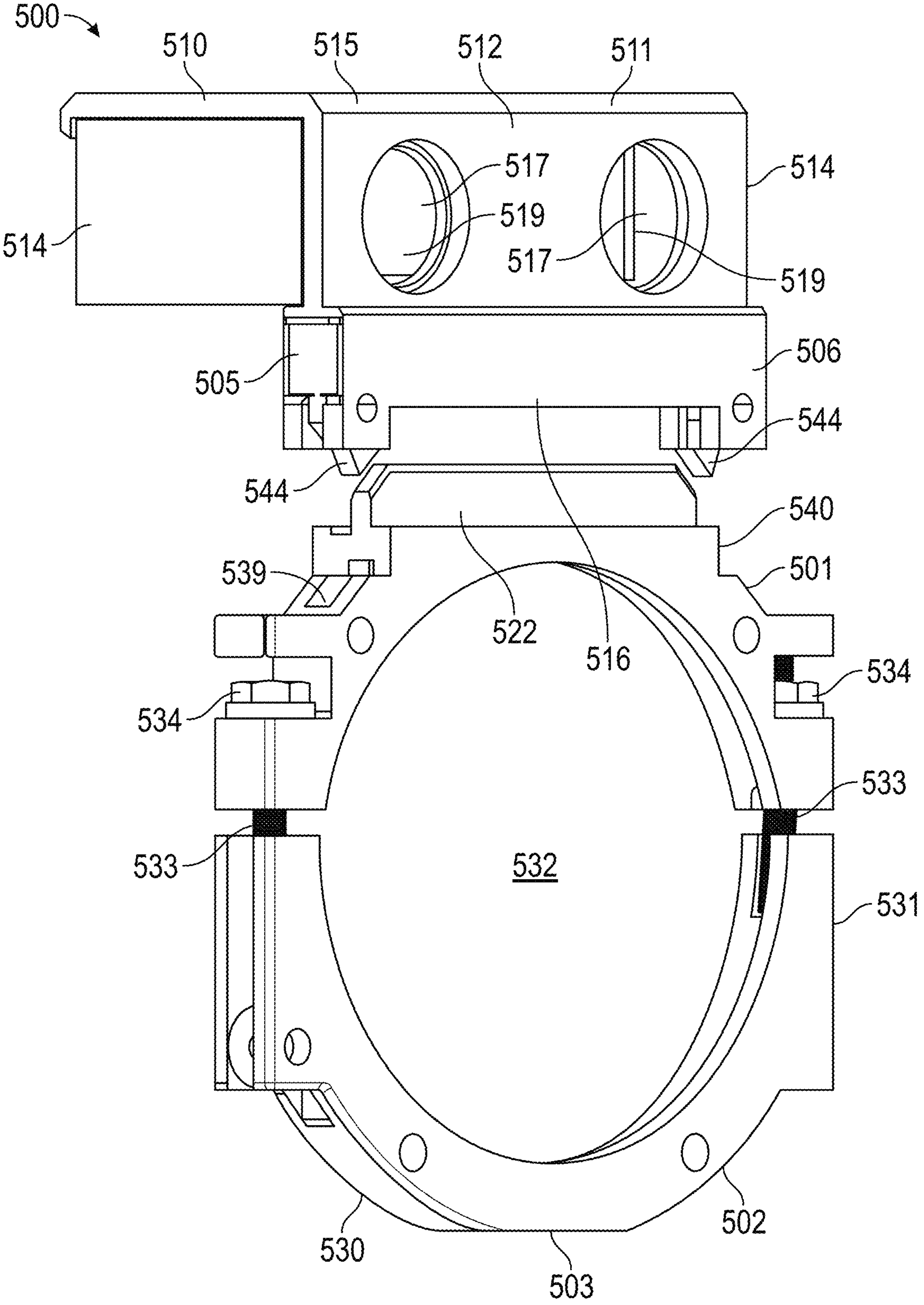
FIG. 11 shows an exploded perspective view of a light assembly where the light fixture is detached state from the mounting subassembly in accordance with a fourth illustrated embodiment.
Figure 12:
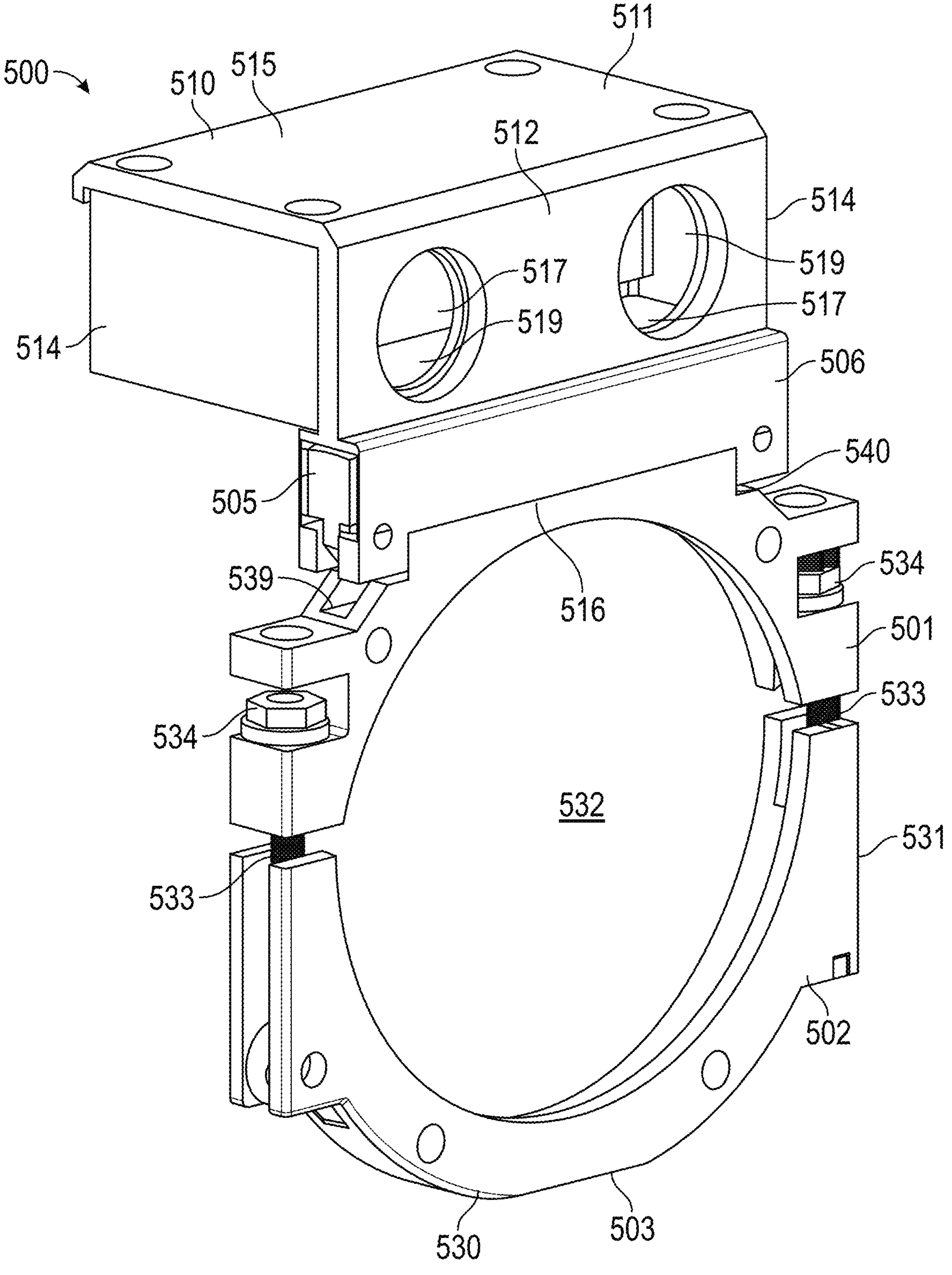
FIG. 12 shows an alternate perspective view of the light assembly according to the fourth illustrated embodiment.
Figure 13:
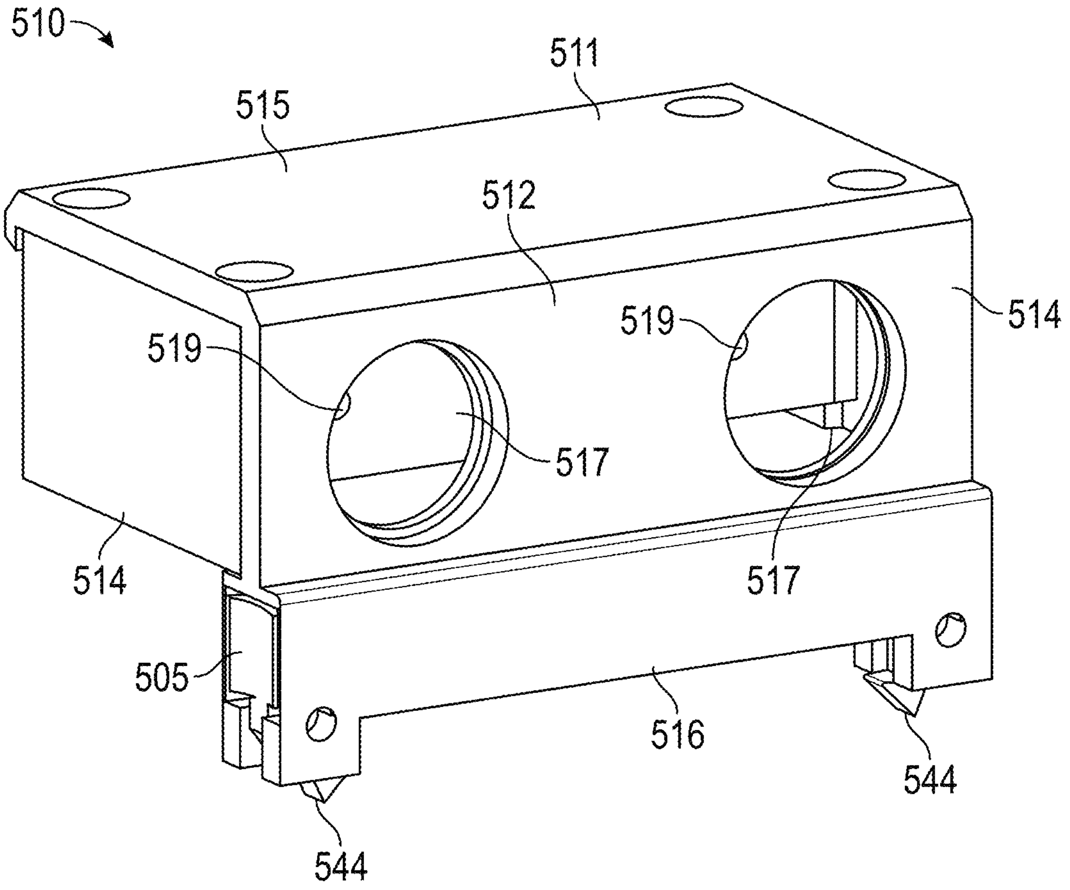
FIG. 13 shows a front perspective view of a light fixture of the light assembly according to the fourth illustrated embodiment.
Figure 14:
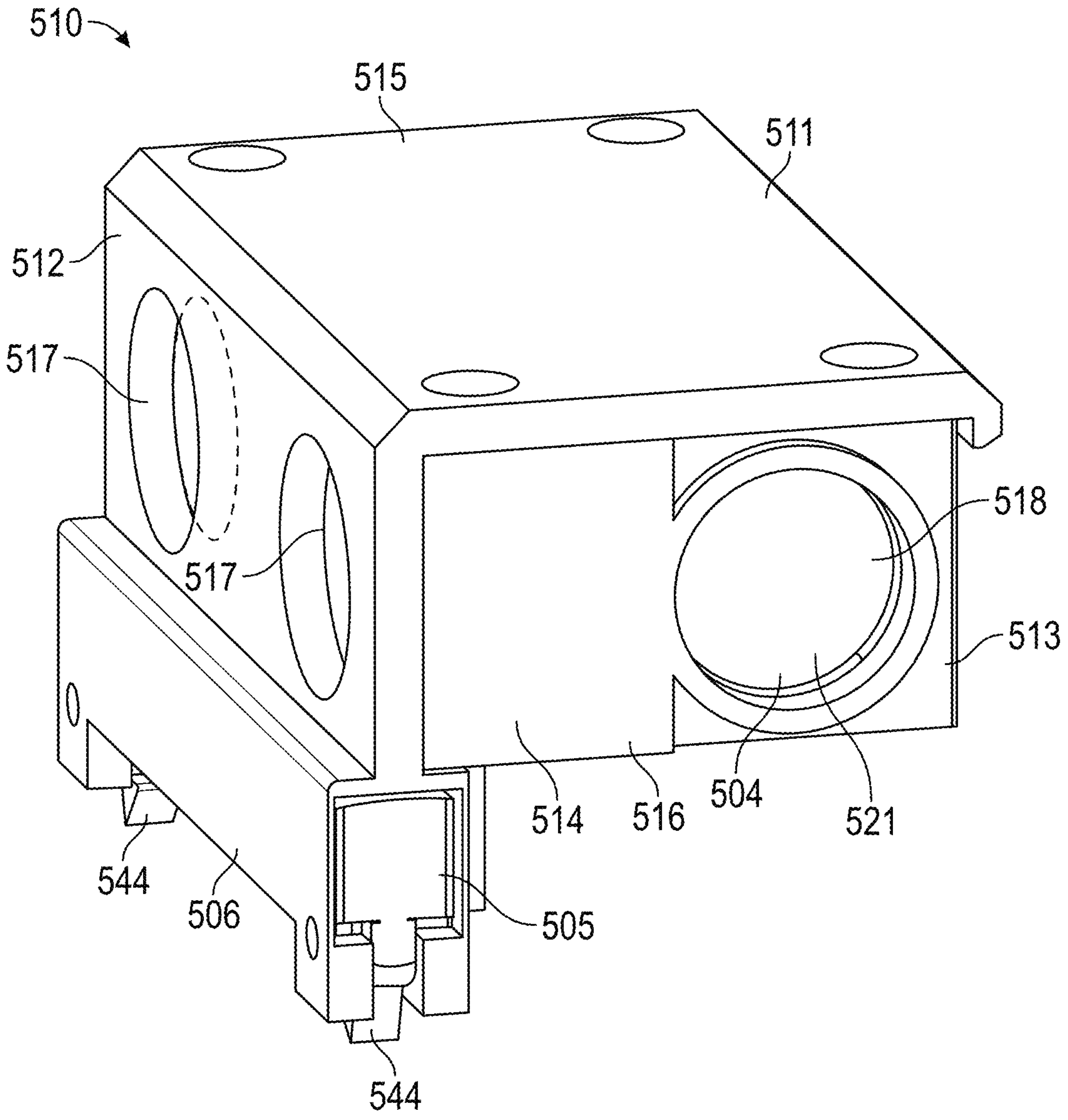
FIG. 14 shows a side perspective view of the light fixture of the light assembly according to the fourth illustrated embodiment.
Figure 15:
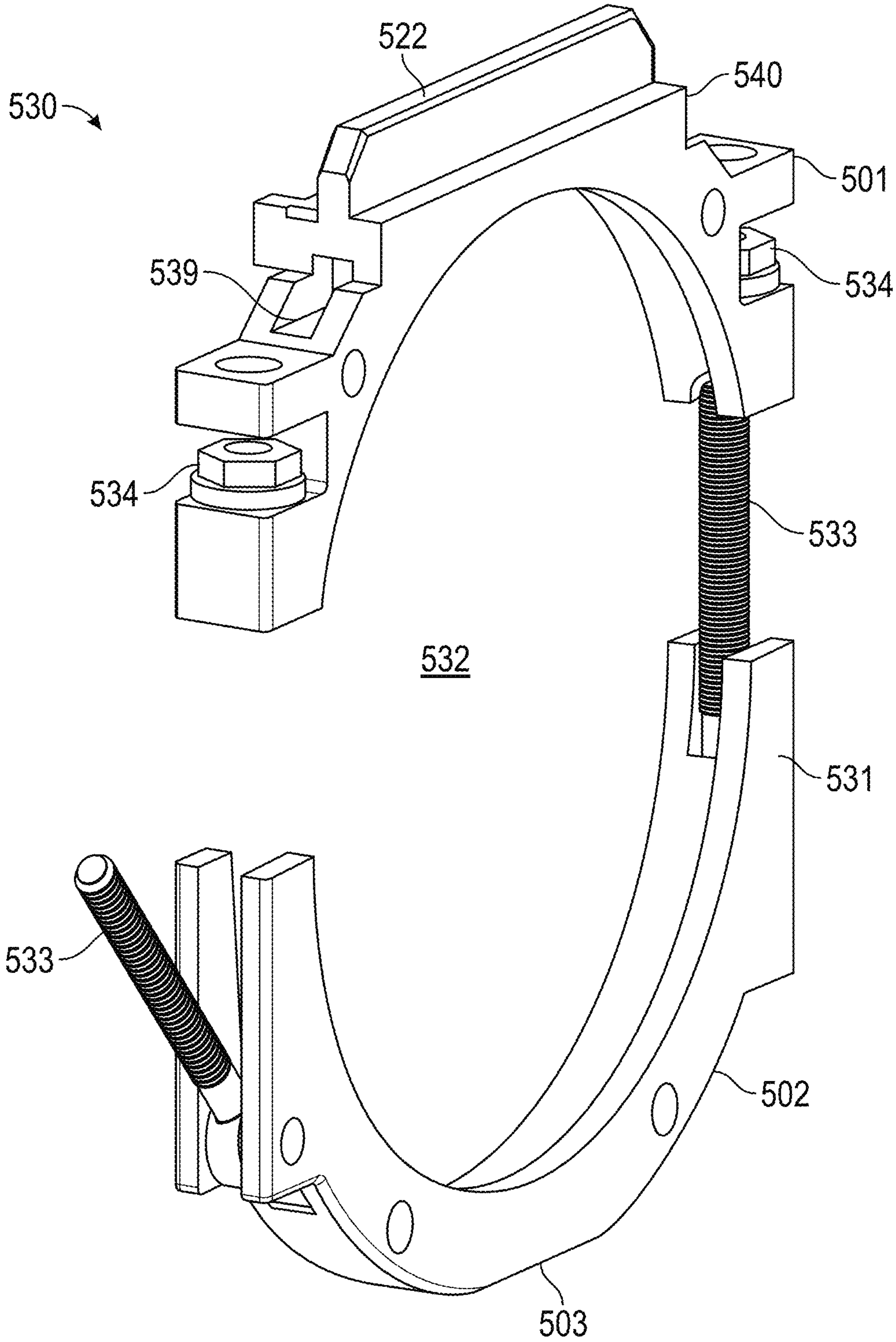
FIG. 15 shows a perspective view of a mounting subassembly of the light assembly according to the fourth illustrated embodiment where the upper and lower halves are uncoupled on one side.
Figure 16:
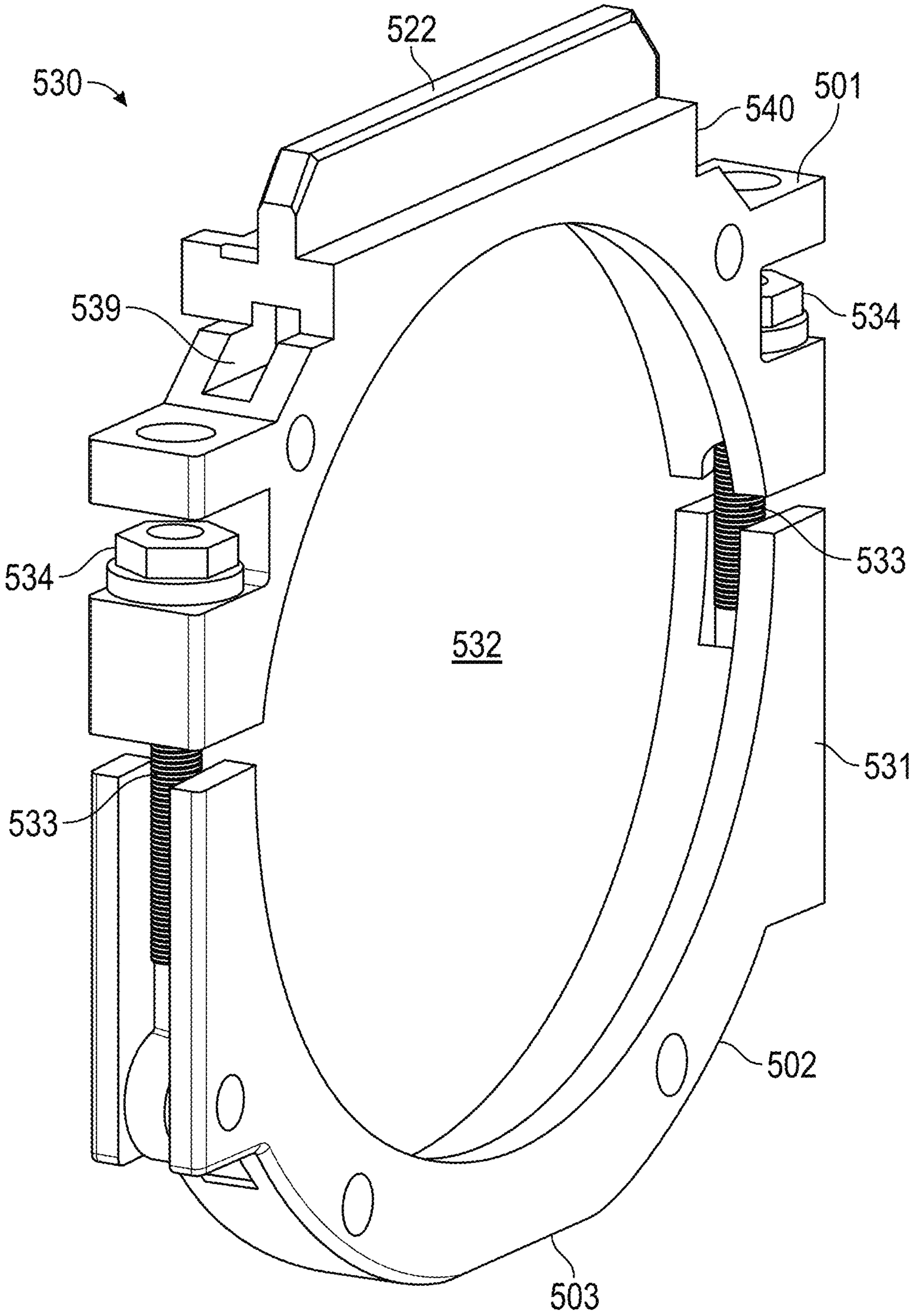
FIG. 16 shows an alternate perspective view of the mounting subassembly o of the light assembly according to the fourth illustrated embodiment.

FIG. 10 shows a light fixture (410) in accordance with a third illustrated embodiment. The light fixture comprises a housing (411) with a front side (412). Disposed on the front side are a plurality of light sources (419). The plurality of light sources comprises light sources having a first color (401) and light sources having a second color (402). The first color comprises a different wavelength than the second color. The different wavelength allows the first color to scatter less and is more optimal to be used for outdoor fires. In some embodiments, the first color comprises an amber hue that allows firefighter to adjust to outdoor fires when the light fixture is turned off. In some embodiments, the second color comprises a green hue that is more optimal for use in structural fires. The color green penetrates through smoke created by burning oil products/hydrocarbons, and the color amber best penetrates burning brush and water droplets. Human eyes are more sensitive to green light which allows the second color to be highly visible against structural backdrops, which can aid with visibility in smoke-filled environments. As shown, the light sources with the first color comprises a greater diameter than the light sources with the second color. In alternative embodiments, the light sources with the second color comprises a greater diameter than the light sources with the first color. As shown, the light sources with the lesser diameter are disposed between the light sources with the greater diameter. In alternative embodiments, the lights sources with the greater diameter are disposed between the light sources with the lesser diameter.

FIG. 11-16 show a light assembly (500) in accordance with a fourth illustrated embodiment. The light assembly comprises a light fixture (510) configured to detachably couple to a mounting subassembly (530), wherein the mounting subassembly is configured to attached to a firehose nozzle. The light fixture comprises a housing (511) having a front side (512), a back side (513) opposite the front side, a top side (515), a bottom side (516) opposite the top side, and two lateral sides (514) coupled to each of the front side, back side, top side, and the bottom side. The front side is in alignment with the mounting subassembly when the light fixture is attached therewith. The front side of the housing comprises a plurality of front apertures (517) each having a light source (519) disposed over or configured to transmit light through the plurality of front apertures. One of the two lateral sides comprises a side aperture (518) covered by an actuator (521). The actuator is configured to change states of the light sources. States of the light sources can include on, off, brightness, color, and blinking, among others as can be appreciated by one having skill in the art and according to the requirements of the scenario. The actuator further acts as a removable cap (504) which can be detached from the side aperture to allow access to a battery contained therein. The battery disposed within the housing is positioned between the plurality of front apertures and the back side of the housing.

The housing (511) further comprises a housing attachment portion (506) extending below the front side (512) of the housing. On each side of the housing attachment portion comprises a latch (544). Each latch comprises a spring bias into a closed state and is configured to rotatably move into an open state upon pressing of a release lever (505) corresponding to each latch. Each latch is independently movable with the release lever associated therewith. The latches are configured to engage with a first slot (539) and a second slot (540) of the mounting subassembly (530). The first and second slots are disposed on sides of a flange (522), wherein the flange is positioned on an upper half (501) of the mounting subassembly. The mounting subassembly comprises a clamp (531) having the upper half and a corresponding lower half (502). Each latch hooks into one of the first and second slots for a secure attachment upon pressing and then release of the release levers. During engagement of the light fixture with the mounting subassembly, the housing attachment portion abuts against the flange. To remove the light fixture, one or both of the latches are changed into the open state by pressing the one or more release levers. In cases where only one latch is pressed into the open state, the light fixture can be pivotally removed from the flange which will subsequently cause the other latch to disengage from its respective slot without the release lever needing to be pressed. Detachment of the light fixture requiring only one of the two latches to be in the open state allows for easier and faster attachment and removal.

The mounting subassembly (530) comprises the upper half (501) and the lower half (502) of the clamp (531), wherein the lower half is configured to couple to the upper half by a bolt (533) and nut (534) disposed on either side. The upper half and lower half form an opening (532) when coupled together. The opening is configured to surround the firehose nozzle of various sizes by having the clamp with an adjustable diameter. Diameter of the opening can vary based on position of the nut with the bolt. The upper half comprises apertures disposed vertically above each nut to allow the bolt to extend therethrough. The mounting subassembly is configured to fixedly coupled to the firehose nozzle upon initial installation to minimize setup and takedown of the light assembly between fire incidents. The lower half further comprises a flat bottom surface (503) to provide stability to the firehose nozzle rested onto a ground surface.

The fourth illustrated embodiment differs from the second illustrated embodiment in that the extrusions (337; 338) of the second embodiment are replaced by slots (539; 540). This is of value if the clamp has been left mounted to the nozzle, and the lights is not required. In such cases, there are no protrusions to cause entanglement with other gear.

Feature List firehose nozzle (100)
adjustor (110)
adjustor front end (120)
adjustor back end (130)
adjustor diameter (140)
adjustor length (150)
body (160)
light assembly (200; 300; 500)
light fixture (210; 310; 410; 510)
housing (211; 311; 411; 511)
front side (212; 312; 412; 512)
back side (213; 313; 513)
lateral side (214; 314; 514)
top side (215; 315; 515)
bottom side (216; 316; 516)
plurality of front apertures (217; 317; 517)
side aperture (218; 318; 518)
light source (219; 319; 419; 519)
battery (220; 320)
actuator (221; 321; 521)
latch (222; 344; 544)
mounting subassembly (230; 330; 530)
front plate (231)
opening (232; 332; 532)
first mounting holes (233)
first cylindrical portion (234)
inner diameter (235)
outer diameter (236)
first extrusion (237; 337)
second extrusion (238; 338)
first slot (239; 339; 539)
second slot (240; 340; 540)
extrusion inner surface (241)
back plate (242)
second mounting holes (243)
second cylindrical portion (244)
plurality of pins (245)
clamp (331; 531)
bolt (333; 533)
nut (334; 534)
lever (335)
first terminal end (341)
second terminal end (342)
gap (343)
first color (401)
second color (402)
upper half (501)
lower half (502)
flat bottom surface (503)
removable cap (504)
release lever (505)
housing attachment portion (506)
flange (522)

What is claimed is:

1. A light assembly, comprising:

a light fixture comprising a housing having a front side, a back side opposite the front side, a top side, a bottom side opposite the top side, and a plurality of lateral sides, the housing further comprising a plurality of front apertures disposed on the front side and a side aperture disposed on one of the plurality of lateral sides, the light fixture further comprising:

a plurality of light sources disposed at the plurality of front apertures, the plurality of light sources configured to emit light in a same direction, an actuator disposed at the side aperture, the actuator configured to control the plurality of light sources, a battery disposed within an interior of the housing between the plurality of light sources and the back side, the battery configured to power the plurality of light sources, and a plurality of latches disposed on the housing, the plurality of latches comprising a spring bias and configured to rotatably move; and a mounting subassembly detachably coupled to the light fixture, the mounting subassembly comprising:

an opening having an adjustable diameter, the opening configured to surround a firehose nozzle, an upper half and a lower half separate and distinct from the upper half, the upper half and lower half forming said opening, one or more fasteners coupling the upper half to the lower half, and a plurality of slots configured to detachably engage with the plurality of latches.

2. The light assembly of claim 1, the mounting subassembly further comprising a flange disposed between the plurality of slots, wherein the housing abuts with said flange.

3. The light assembly of claim 1, the lower half of the mounting subassembly further comprising a flat bottom surface.

4. A light assembly, comprising:

a light fixture comprising a housing having a front side, a back side opposite the front side, a top side, a bottom side opposite the top side, and a plurality of lateral sides, the housing further comprising a plurality of front apertures disposed on the front side, the light fixture further comprising:

a plurality of light sources disposed at the plurality of front apertures, an actuator configured to control the plurality of light sources, and a battery disposed within an interior of the housing, the battery configured to power the plurality of light sources; and a mounting subassembly detachably coupled to the light fixture, the mounting subassembly comprising an opening configured to surround a firehose nozzle.

5. The light assembly of claim 4, the housing further comprising a side aperture disposed on one of the plurality of lateral sides, wherein the actuator is disposed at the side aperture.

6. The light assembly of claim 4, wherein the battery is disposed between the plurality of light sources and the back side.

7. The light assembly of claim 4, wherein the actuator is configured to control power, brightness, color, blinking, or a combination thereof.

8. The light assembly of claim 4, wherein the plurality of light sources is configured to emit light in a same direction.

9. The light assembly of claim 4, wherein at least one of the plurality of light sources comprises a first color and at least one of the plurality of light sources comprises a second color wherein the first color comprises a different wavelength from the second color.

10. The light assembly of claim 9, wherein the first color comprises an amber hue and the second color comprises a green hue.

11. The light assembly of claim 4, wherein the mounting subassembly is configured to slidably rotate about the firehose nozzle upon attachment to said firehose nozzle.

12. The light assembly of claim 4, wherein the opening comprises an adjustable diameter.

13. The light assembly of claim 4, the light fixture further comprising a latch disposed on the housing.

14. The light assembly of claim 13, the mounting subassembly further comprising a slot, the slot configured to engage with the latch for detachable engagement.

15. The light assembly of claim 13, wherein the latch is configured to rotatably move.

16. The light assembly of claim 15, the latch further comprising a spring bias.

17. The light assembly of claim 15, further comprising a plurality of latches wherein each of the plurality of latches is independently movable.

18. The light assembly of claim 4, the mounting subassembly further comprising a front plate and a back plate coupled to the front plate by a plurality of pins.

19. The light assembly of claim 4, the mounting subassembly further comprising a clamp configured to adjust a diameter of the opening.

20. The light assembly of claim 4, the mounting subassembly further comprising an upper half and a lower half separate and distinct from the upper half, the upper half and the lower half forming said opening.

* * * * *